United States Patent
Srinivasan et al.

(10) Patent No.: US 11,112,984 B2
(45) Date of Patent: Sep. 7, 2021

(54) DATABASE DRIVEN APPROACH TO FORMAT TEXT, COLOR, AND DISPLAY OF MESSAGES ON VARIOUS DISPLAYS

(71) Applicant: Honeywell International Inc., Morris Plains, NJ (US)

(72) Inventors: Divya Swarup Giriyappa Srinivasan, Bangalore (IN); Thomas D. Judd, Woodinville, WA (US); Kathryn Bates Hill, Milton-Freewater, OR (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 15/676,867

(22) Filed: Aug. 14, 2017

(65) Prior Publication Data

US 2018/0300077 A1  Oct. 18, 2018

(30) Foreign Application Priority Data

Apr. 17, 2017  (IN)  ............................. 201741013589

(51) Int. Cl.
| | |
|---|---|
| *G06F 3/06* | (2006.01) |
| *G06F 3/0482* | (2013.01) |
| *G06F 16/00* | (2019.01) |
| *G06F 40/103* | (2020.01) |

(52) U.S. Cl.
CPC .......... *G06F 3/0638* (2013.01); *G06F 3/0482* (2013.01); *G06F 3/0661* (2013.01); *G06F 16/00* (2019.01); *G06F 40/103* (2020.01)

(58) Field of Classification Search
CPC ............................. G06F 3/0638; G06F 17/30
See application file for complete search history.

(56) References Cited

U.S. PATENT DOCUMENTS

| | | | |
|---|---|---|---|
| 9,643,735 B2 | 5/2017 | Khatwa et al. | |
| 9,881,504 B2* | 1/2018 | Dominic | ............... G08G 5/0013 |
| 10,425,505 B2* | 9/2019 | McGuffin | ........... H04B 7/18506 |
| 2003/0125055 A1 | 7/2003 | Kim et al. | |
| 2008/0163093 A1 | 7/2008 | Lorido | |
| 2010/0125403 A1 | 5/2010 | Clark et al. | |
| 2013/0232237 A1* | 9/2013 | Zulch, III | .......... H04B 7/18506 |
| | | | 709/220 |

(Continued)

FOREIGN PATENT DOCUMENTS

WO    2009046462 A1    4/2009

OTHER PUBLICATIONS

"Xtreme Vision ADS-B Display System with Synthetic Vision Traffic User's Guide", 2016, pp. 1-70, Publisher: SkyVision Xtreme, LLC.

(Continued)

*Primary Examiner* — Maikhanh Nguyen
(74) *Attorney, Agent, or Firm* — Fogg & Powers LLC

(57) ABSTRACT

A method and system for formatting datalink messages is disclosed. The method comprises providing a format style of parameters and/or portions of free text for a datalink message; sending the datalink message to a destination; decoding the datalink message at the destination for both content and format style information; sending the content and format style information to a display processor; and generating parameter or free text highlighting information on a display screen corresponding to the content and format style information.

10 Claims, 9 Drawing Sheets

(56) References Cited

U.S. PATENT DOCUMENTS

| | | | | |
|---|---|---|---|---|
| 2014/0253585 | A1* | 9/2014 | Paul Dominic | B64D 45/00 345/629 |
| 2015/0081138 | A1* | 3/2015 | Lacko | B64D 45/00 701/3 |
| 2016/0019794 | A1* | 1/2016 | Dominic | G08G 5/0052 701/484 |
| 2016/0093222 | A1* | 3/2016 | Hale | G08G 5/0039 701/120 |
| 2016/0347471 | A1 | 12/2016 | Shamasundar et al. | |

OTHER PUBLICATIONS

Cascading Style Sheets, Wikipedia, pp. 1-26, drawn from the Internet: https://en.wikipedia.org/w/index.php?title=Cascading_Style_Sheets&oldid=774931605.

Data Link, Wikipedia, pp. 1, drawn from the Internet: https://en.wikipedia.org/w/index.php?title=Data_link&oldid=774640422.

HTML, Wikipedia, pp. 1-13, drawn from the Internet: https://en.wikipedia.org/w/index.php?title=HTMLlink&oldid=774893558.

European Patent Office, "Extended European Search Report from EP Application No. 18167127.2 dated Mar. 20, 2018", from Foreign counterpart of U.S. Appl. No. 15/676,867, Aug. 20, 2018, pp. 1-13, Published in EP.

European Patent Office, "Communication pursuant to Article 94(3) from EP Application No. 181671272", from Foreign Counterpart to U.S. Appl. No. 15/676,867, Apr. 28, 2020, pp. 1 through 8, Published: EP.

Driven Technologies, Inc., "Boeing 737 Multi-Color Control Display Unit (MCDU)", no later than 2015, pp. 1-3.

European Patent Office, "Summons to attend oral proceedings pursuant to Rule 115(1) EPC from EP Application No. 18167127.2", from Foreign Counterpart to U.S. Appl. No. 15/676,867, Dec. 16, 2020, pp. 1 hrough 9, Published: EP.

* cited by examiner

200

1234z  FLIGHT INITIALIZATION

FLIGHT NUMBER: HON1212
SCHEDULE DATE: 23
DEPARTURE STATION: KPHX
DESTINATION STATION: KSEA
ALTERNATE STATION: KLAX
FLIGHT PLAN TIME: 12:14
FUEL BOARDED: [ 780 ]

1234z  FLIGHT INITIALIZATION

FLIGHT NUMBER: HON1212
SCHEDULE DATE: 23
DEPARTURE STATION: KPHX
DESTINATION STATION: KSEA
ALTERNATE STATION: KLAX
FLIGHT PLAN TIME: 12:14
FUEL BOARDED: 780

| # | Length | Element Type | Message Content After <STX> Char | | |
|---|---|---|---|---|---|
| | | | Destination Parameter | Element Description | |
| 1 | 2 | Field | | Priority Code | |
| 2 | 7 | Field | | Ground Address | |
| 3 | 5 | Message Ident | | Message Identifier | |
| 4 | 2 | Field | INIT_MSG_VRSN | Message Version | |
| 5 | 2 | Field | | Date of Message Generation | |
| 6 | 4 | Field | | Time of Message Generation | |
| 7 | 2 | Field | | <CR><LF> | |
| 8 | 4 | Field | INIT_DEPT_STA | Departure Station | |
| 9 | 4 | Field | INIT_DEST_STA | Destination Station | |
| 10 | 4 | Field | ALTN_STA | Alternate Station | |
| 11 | 5 | Field | FLIGHT_PLAN_TIME | Flight Plan Time | |
| 12 | VAR | Field | BOARDED_FUEL | Boarded Fuel | |

FIG. 3C

| # | Length | Element Type | Message Content After <STX> Char | |
|---|---|---|---|---|
| | | | Destination Parameter | Element Description |
| 1 | 2 | Field | | Priority Code |
| 2 | 7 | Field | | Ground Address |
| 3 | 5 | Message Ident | | Message Identifier |
| 4 | 2 | Field | INIT_MSG_VRSN | Message Version |
| 5 | 2 | Field | | Date of Message Generation |
| 6 | 4 | Field | | Time of Message Generation |
| 7 | 2 | Field | | <CR><LF> |
| 8 | 4 | Field | INIT_DEPT_STA | Departure Station |
| 9 | 5 | Field | INIT_DEST_STA_STYLE | Departure_Format_Style |
| 10 | 4 | Field | INIT_DEST_STA | Destination Station |
| 11 | 1 | Field | INIT_DEST_STA_STYLE | Destination_Format_Style |
| 12 | 4 | Field | ALT_STA | Alternate Station |
| 13 | 4 | Field | ALTN_STA_STYLE | Alternate Station_Style |
| 14 | 5 | Field | FLIGHT_PLAN_TIME | Flight Plan Time |
| 15 | 1 | Field | FLIGHT_PLAN_TIME_STYLE | Flight Plan Time_Style |
| 16 | VAR | Field | BOARDED_FUEL | Boarded Fuel |
| 17 | 1 | Field | BOARDED_FUEL_STYLE | BOARDED_FUEL_Format_Style |

FIG. 3A

```
hhmmz    FLIGHT INITIALIZATION XXXXXXXXXX

FLIGHT NUMBER:       XXXXXXXXX
SCHEDULED DATE:      DD
DEPARTURE STATION:   XXXX
DESTINATION STATION: XXXX
ALTERNATE STATION:   XXXX
FLIGHT PLAN TIME:    HH:MM
FUEL BOARDED:        NNNNNN
```

300

FLIGHT INITIALIZATION

1234z

- FLIGHT NUMBER: HON1212
- SCHEDULE DATE: 23
- DEPARTURE STATION: KPHX
- DESTINATION STATION: KSEA
- ALTERNATE STATION: KLAX
- FLIGHT PLAN TIME: 12:14
- FUEL BOARDED: 780

FLIGHT INITIALIZATION

1234z

- FLIGHT NUMBER: HON1212
- SCHEDULE DATE: 23
- DEPARTURE STATION: KPHX
- DESTINATION STATION: KSEA
- ALTERNATE STATION: KLAX
- FLIGHT PLAN TIME: 12:14
- FUEL BOARDED: 780

FIG. 5B

Uplink message:
<STX>01ADDRESS12345012S1256,,NOC TEXT MESSAGE,HI N757HW PLS BE ADVSD THE FIRST<CR>AVBL
|<sp>TOUCHDOWN TIME IN PHX IS<CR>2105 UTC.|<CR> PLS SLOW DOWN AND<CR>PLAN
ACCORDINGLY. KINDLY ACK.<CR>TKS GDC. NOC<ETX>

| # | Length | Element Type | Message Content After <STX> Char | |
|---|---|---|---|---|
| | | | Destination Parameter | Element Description |
| 1 | 2 | Field | | Priority Code |
| 2 | 7 | Field | | Ground address |
| 3 | 5 | Message Ident | | Message Identifier |
| 4 | 2 | Field | | Message version |
| 5 | 2 | Field | | Date of message generation |
| 6 | 4 | Field | | Time of message generation |
| 7 | 2 | Field | | Delimiter |
| 8 | VAR | Field | DISP_MSG_TITLE | Message title |
| 9 | VAR | Field | DISP_MSG_TXT_BLK | Message textline |

FIG. 6

1234z  NOC TEXT MSG

HI N757HW PLS BE ADVSD THE FIRST
AVBL TOUCHDOWN TIME IN PHX IS
2105 UTC. PLS SLOW DOWN AND
PLAN ACCORDINGLY. KINDLY ACK.

TKS GDC. NOC

1234z  NOC TEXT MSG

HI N757HW PLS BE ADVSD THE FIRST
AVBL TOUCHDOWN TIME IN PHX IS
2105 UTC. *PLS SLOW DOWN AND
PLAN ACCORDINGLY.* KINDLY ACK.

TKS GDC. NOC

1234z    ATIS

SEATAC INTERNATIONAL
INFORMATION
1300Z WEATHER
CEILING 3000 OVERCAST
VISIBILITY 3 SMOKE
TEMPERATURE 68
WIND 210 AT 10
ALTIMETER 2992
DEPARTURE RUNWAY 16L
ILS RUNWAY 16R APPROACH IN USE

1234z    ATIS

SEATAC INTERNATIONAL
INFORMATION
1300Z WEATHER
CEILING 3000 OVERCAST
VISIBILITY [3 SMOKE]
TEMPERATURE 68
WIND 210 AT 10
ALTIMETER 2992
DEPARTURE RUNWAY 16L
ILS RUNWAY 16R APPROACH IN USE

FIG. 9B

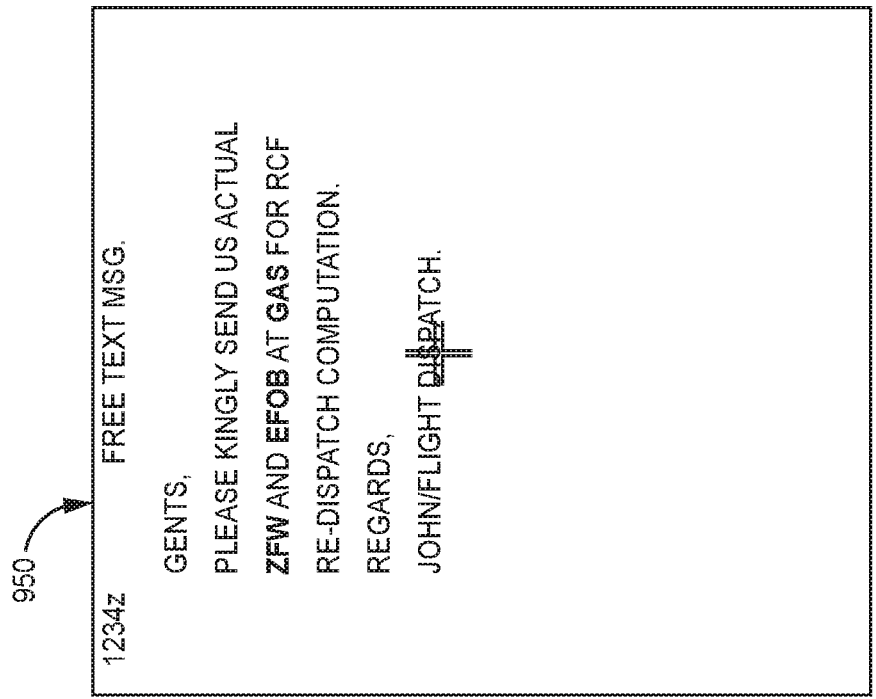

DATABASE DRIVEN APPROACH TO FORMAT TEXT, COLOR, AND DISPLAY OF MESSAGES ON VARIOUS DISPLAYS

CROSS REFERENCE TO RELATED APPLICATION

This application claims the benefit of priority to Indian Patent Application No. 201741013589, filed on Apr. 17, 2017, which is herein incorporated by reference.

BACKGROUND

Currently, datalink products and services offer limited style and formatting capabilities for display of datalink messages, usually the traditional white or green text on black background of a display screen. Although some display devices offer different formatting capabilities, datalink messages are not taking advantage of the formatting capabilities supported by such display devices.

There is interest in having color and text formatting capabilities, as well as other formatting capabilities like a graphical circle, for datalink messages, such as for airline operational communication messages. While some text display formatting (color and font size) is used on datalink screens, limited text formatting is applied to the display of uplinked report messages.

SUMMARY

A method and system for formatting datalink messages is disclosed. The method comprises providing a format style of parameters and/or portions of free text for a datalink message; sending the datalink message to a destination; decoding the datalink message at the destination for both content and format style information; sending the content and format style information to a display processor; and generating parameter or free text highlighting information on a display screen corresponding to the content and format style information.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 2A and 2B depict an exemplary display screen for an onboard display device, illustrating the formatting of datalink messages according to a first approach, which provides a format style of parameters based on values;

FIG. 3A depicts an exemplary display screen for an onboard display device, illustrating the formatting of datalink messages according to a second approach, which provides a format style for each parameter of an uplink message;

FIG. 3B shows an exemplary current airline operational communication (AOC) database;

FIG. 3C shows the expanded set of information that will be stored upon reception of the uplinked message, to accommodate the format style information for displaying parameters according to the second approach;

FIGS. 5A and 5B depict an exemplary display screen for an onboard display device, illustrating the formatting of datalink messages according to the second approach;

FIG. 6 shows an example of an AOC message text block for an uplink message along with a table of fields.

FIGS. 7A and 7B depict an exemplary display screen for an onboard display device, illustrating the formatting of datalink messages according to the second approach in providing a format style of free text;

FIGS. 9A and 9B depict an exemplary display screen for an onboard display device, illustrating an uplink using the format style of parameters according to the first approach; and FIGS. 10A and 10B depict an exemplary display screen for an onboard display device, illustrating the formatting of datalink messages according to the second approach in providing a format style of free text.

DETAILED DESCRIPTION

Figure 1:
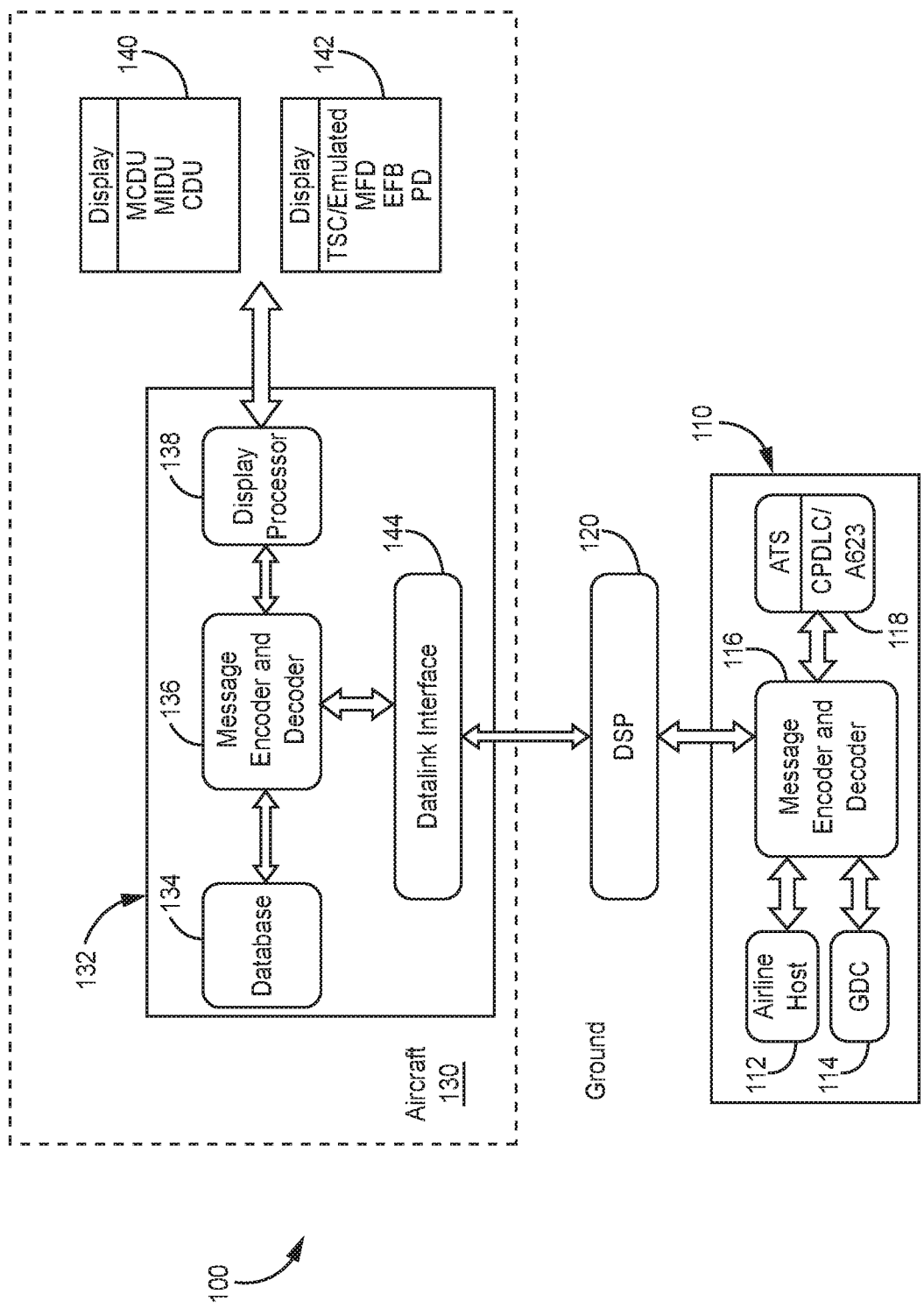
FIG. 1 a block diagram of a system for formatting datalink messages for air/ground communications, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A database driven approach to format text, color, and display of datalink messages on various display devices is provided. The present approach offers dynamic database driven techniques to format parameters of datalink messages based on various conditions.

The database can be a file created by a tool, loaded onto a target platform where operational software is located. The operational software interprets the database to take the desired actions, and the database can be changed or updated without having to recertify the operational software.

In a first approach, a format style of parameters for datalink messages is logic driven in a database, such as an airline operational communication (AOC) database (also called airline modifiable information (AMI) in some aircraft) or a datalink display database, and is based on parameter values. As the first approach is database driven, it is configurable and customizable by a user such as airline personnel. The first approach is useful, for example, in both Aircraft Communications Addressing and Reporting System (ACARS) AOC (or non-ACARS AOC) downlink pages or uplink pages, where based on the conditions defined in the database, the various formatting styles are applied. Examples of non-ACARS AOC messages include binary messages which reside on an electronic flight bag (EFB). The advantage of the first approach is that no changes to ground airline infrastructure or message size are needed. However, there needs to be an update to the database if a new formatting rule has to be applied.

In a second approach, the formatting style, for each parameter or character string within free text, is included in the uplink message. The database or message decoder/encoder software provides a formatting style guide so the software can interpret and implement the formatting styles uplinked in the message. An operator can decide the parameters to make format style configurable, which is indicated in the database. The ground software sends the formatting style as part of the datalink message, so the second approach is not limited to pre-defined formatting present in the database. The second approach is useful for ACARS AOC (or non-ACARS AOC) uplink pages, for example. The format style can be sent in the uplink along with uplink text for all parameters (full text or partial text). This gives full flexibility to airlines to control the format style for all messages sent from an AOC center. The advantage of the second approach is that there is no need to update the database to apply a new formatting rule. It should be noted that the second approach needs to be implemented to use some default formatting when uplink messages are received that do not include formatting style information.

In a third approach, customization rules in a database are used to provide customization to non-database defined static pages, where certification is a constraint. The third approach allows limited customization options by airlines for such static pages.

Different format styles can be used to enhance datalink messages shown on various display platforms using the foregoing approaches. Such format styles can be used to highlight warnings and significant data, significant messages, or significant parts of messages. Examples of format styles include bold type, italics type, font type, font size, color, reverse video (background and text color inverted), background, encircling or boxing (of text, parameters, fields, data, etc.), underlining, flashing, or the like. Further emphasis can be given using graphics in addition to the above format styles, depending on the capabilities of the display.

In some cases, the uplink message does not contain format style information, but the database defines the format style for parameters or free text characters of the uplink message (e.g., Controller Pilot Data Link Communications (CPDLC) message parameters). In addition, the format style of parameters may also be based on parameter values according to logic defined in the AOC database or datalink display database. For example, the logic can provide a particular color under certain conditions, and another color under other conditions.

The present methods provide the capability to have an AOC database defined screen be displayed for a received uplink message, which means all the inherent formatting capability part of the AOC database screen can be done even in an uplink display. In addition, the present techniques can be applied to enhance downlink messages received on the ground.

It should be understood that the scope of the present methods is not limited to datalink products, but can be applied to other avionics, such as line replaceable units (LRUs) that also need to display messages (e.g., a flight management computer (FMC), displays and crew alerting (DCA), an EFB, or the like.

Further details of various embodiments are described hereafter with reference to the drawings.

FIG. 1 a block diagram of the overall architecture of a system 100 for formatting datalink messages for air/ground communications, according to one embodiment. The system 100 generally includes a ground center 110, a ground datalink service provider (DSP) 120, and at least one aircraft 130. The DSP 120 provides datalink communication services between ground center 110 and aircraft 130.

The ground center 110 can include a ground airline host 112, or an operations center such as Honeywell's ground global data center (GDC) 114, or an Air Traffic Control (ATC) and Flight Information Services (FIS) (ATC/FIS) center, for example. These are in operative communication with a message encoder and decoder unit 116. The ground center 110 also includes an Air Traffic Services (ATS) unit 118, which provides CPDLC or FIS, and ARINC 623 ATC messages. The ATS unit 118 is in operative communication with message encoder and decoder unit 116.

The aircraft 130 includes an avionics unit 132, which includes a database 134 that is in operative communication with a message encoder and decoder module 136, which can be located in a communications management unit (CMU), a flight management system (FMS), an EFB, a cabin terminal, a flight crew tablet, or other datalink avionics system of aircraft 130. A display processor 138 in avionics unit 132 is in operative communication with message encoder and decoder module 136. One or more onboard display devices 140, 142 operatively communicate with display processor 136. The avionics unit 132 also includes a datalink interface 144, which operatively communicates with message encoder and decoder module 136 and DSP 120.

Examples of display device 140 include text-only displays such as a multi-function control display unit (MCDU), a multi-input interactive display unit (MIDU), a cockpit display unit (CDU), or the like. Examples of display device 142 include graphical displays such as a touch screen controller (TSC) with emulated display (such as emulated MCDU), a multi-function display (MFD), an EFB display, a portable device (PD) display, or the like.

During operation of system 100 for delivering uplink messages, ground airline host 112 or an operations center like GDC 114, includes the format style as part of an uplink message to be sent to aircraft 130. The message encoder and decoder module 136 decodes the uplink message using database 134 for both content and format style information, which is then sent to display processor 138. The display device 140 then generates the graphics/formatting corresponding to the information sent to display processor 138.

FIGS. 2A and 2B depict an exemplary display screen 200 for an onboard display device, illustrating the formatting of datalink messages according to the first approach, which provides a format style of the parameters. Each parameter will be defined with a default formatting style and its formatting style may also be based on its value; the formatting can be changed by rules defined in the conditional formatting logic of the AOC database. For example, when there is excess fuel or low fuel in the aircraft, the fuel value indicator (FUEL BOARDED: 780) can change color (such as to red) or have encircled text (shown in FIG. 2A). Where there is nominal fuel in the aircraft, the fuel value indicator can have a green color, for example. The AOC database defines the various ranges for fuel and the format style to be applied for the various ranges.

FIG. 3A depicts an exemplary display screen 300 for an onboard display device, illustrating the formatting of datalink messages according to the second approach, which provides a format style for each parameter of an uplink message. In this approach, each parameter that is capable of configuring its display format has its own format style information sent in the uplink message from the ground. For example, parameters such as flight number, scheduled date, departure station, destination station, and fuel boarded, can have a format style sent from the ground, such as different colors and/or styles for each parameter. FIG. 3B shows an exemplary current AOC database. FIG. 3C shows an exemplary expanded set of information that can be stored, and associated with the uplink, to accommodate the format style information for displaying the parameters on display screen 300.

Figures 4A, 4B:
FIG. 4A is a table showing how the formatting style for a parameter of an uplink message is conveyed using the second approach.
FIG. 4B is a table of the International Organization for Standardization (ISO) 5 characters for Aeronautical Radio, Incorporated (ARINC) Specification 620.

FIG. 4A is a table showing how the formatting style for a parameter of an uplink message can be conveyed using the second approach. After every parameter of an uplink message, one character field is added to indicate the format style for the parameter. This is shown in the table of FIG. 4A for different colors. For example, the hex value 0x30 or ISO '0' indicates a green color and bold format for a parameter; the hex value 0x50 or ISO 'Q' indicates an amber color and bold font for a parameter. FIG. 4B is a table of the ISO 5 characters for ARINC Specification 620.

FIGS. 5A and 5B show an exemplary display screen 500 for an onboard display device, illustrating the formatting of datalink messages according to the second approach in providing a format style for each parameter of an uplink message. As shown in FIG. 5B, the parameters of flight number, departure station, destination station, and fuel boarded have their own format styles compared to these same parameters without any formatting style (shown in FIG. 5A).

The formatting style according to the second approach can also be conveyed in a free text (text block) of an uplink message. The combination of two ISO characters can be used to convey the formatting style in any place of a character string for the text block data. The first character can be '|' (vertical pipe), to act as a format identifier. The second character can be an ISO 5 character, to indicate the color and style. All text following these two characters can be formatted as per the style mentioned, unless a new formatting style appears later. To end the custom format and return to standard formatting, "|<CR>" can be used. For example, |<sp> indicates a green color for a parameter; |Q indicates an amber color and bold font; and |<CR> indicates a return to standard text (e.g., white text) with normal font.

FIG. 6 shows an example of an AOC message text block for an uplink message along with a table of fields. The bold characters of the uplink message are the message text, which is the last field in the uplink (DISP_MSG_TXT_BLK) shown in the table. The other characters in the message text are the special formatting instructions embedded in the uplink message. This approach is one possibility and is not the only way to convey the formatting style in the uplink text. For example, another element can be used before the free text to indicate the format style information as done for parameters.

FIGS. 7A and 7B depict an exemplary display screen 700 for an onboard display device, illustrating the formatting of datalink messages according to the second approach in providing a format style of free text. As shown in FIG. 7B, portions of the text block can be highlighted, such as by using different colors or font/size, compared to the text block without any formatting style (shown in FIG. 7A).

Figures 8A, 8B:
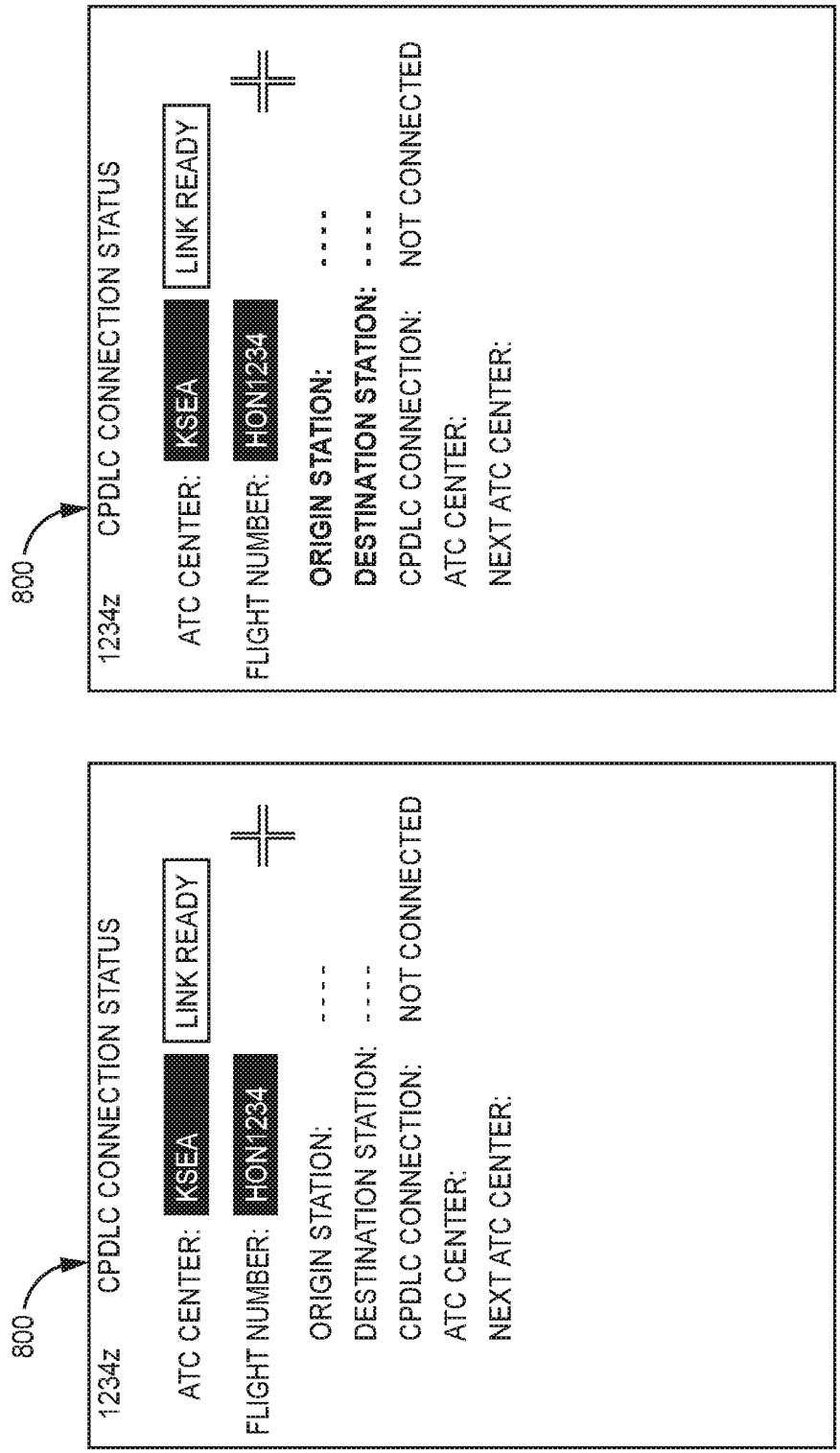
FIGS. 8A and 8B show an exemplary display screen for an onboard display device, illustrating a third approach in which AOC database driven formatting of static pages is provided.

FIGS. 8A and 8B show an exemplary display screen 800 for an onboard display device, illustrating the third approach in which database driven formatting of static pages (like CPDLC or A623 FIS) is provided. For example, this approach can be used for a Logon or Status page when all fields are entered but Logon or Status is still not enabled. The missing data for a field is highlighted with a color or different font/size, for example, when mandatory data has not been entered (shown in FIG. 8B). Limited capability can be provided to customize the display style of parameters or fields on static pages. Based on certain fields entered, the other inputs needed are not highlighted. In this example, Origin and Destination needs to be entered in the FMC. With current logic it is not an entry field on this page, but without this data entered on the FMC, the SEND Prompt will not appear.

FIGS. 9A and 9B depict an exemplary display screen 900 for an onboard display device, illustrating an FIS Automatic Terminal Information Service (ATIS) uplink using the format style of parameters. For example, existing logic units and conditional formatting logic of the datalink display database can be used to format data parameters with different color, font, size, encircling/boxing, etc. on display screen 900, as shown in FIG. 9B, compared to these same parameters without any formatting style (shown in FIG. 9A).

FIGS. 10A and 10B depict an exemplary display screen 950 for an onboard display device, illustrating the formatting of datalink messages according to the second approach in providing a format style of free text. As shown in FIG. 10B, portions of the text block for an advisory message to the flight crew can be highlighted in different colors or font/size, compared to the text block without any formatting style (shown in FIG. 10A).

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system and method.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method of formatting datalink messages, the method comprising: providing a format style of parameters and/or portions of free text for a datalink message; sending the datalink message to a destination; decoding the datalink message at the destination for both content and format style information; sending the content and format style information to a display processor; and generating parameter or free text highlighting information on a display screen corresponding to the content and format style information.

Example 2 includes the method of Example 1, wherein the format style of parameters is defined in an airline operational communication (AOC) database, a datalink display database, or is based on parameter values according to logic defined in the AOC database or the datalink display database.

Example 3 includes the method of Example 1, wherein the format style of parameters and/or portions of free text is provided in the datalink message for parameters or text portions of the datalink message.

Example 4 includes the method of Example 1, wherein the format style of parameters is provided in customization rules to provide customization to non-database defined static pages.

Example 5 includes the method of any of Examples 1-4, wherein the format style of parameters and/or portions of free text includes one or more of bold type, italics type, font type, font size, color, reverse video, background, encircling, boxing, underlining, or flashing.

Example 6 includes a computer program product comprising a non-transitory computer readable medium having instructions stored thereon executable by a processor to perform a method of formatting datalink messages according to any of Examples 1-5.

Example 7 includes a method of formatting datalink messages for air/ground communications, the method comprising: receiving an uplink message in an aircraft; decoding the uplink message in an avionics unit of the aircraft, using an onboard message encoder/decoder, and an onboard AOC database or a datalink display database, for content and format style information; sending the content and format style information to an onboard display processor; and generating parameter or free text highlighting information on an onboard display screen corresponding to the content and format style information.

Example 8 includes the method of Example 7, wherein the format style information is defined in the AOC database or the datalink display database, or is based on parameter values according to logic defined in the AOC database or the datalink display database.

Example 9 includes the method of Example 7, wherein the format style information is provided in the uplink message for each parameter or text portion of the uplink message.

Example 10 includes the method of Example 7, wherein the format style information is provided in customization rules to provide customization to non-database defined static pages.

Example 11 includes the method of any of Examples 7-10, wherein the format style information includes one or more of bold type, italics type, font type, font size, color, reverse video, background, encircling, boxing, underlining, or flashing.

Example 12 includes a computer program product comprising: a non-transitory computer readable medium having instructions stored thereon executable by a processor to perform a method of formatting datalink messages for air/ground communications according to any of Examples 7-11.

Example 13 includes a system for formatting datalink messages for air/ground communications, the system comprising: a ground center operative for datalink communications with an aircraft, the ground center comprising: an airline host, a data center, an operations center, or an air traffic control (ATC) and flight information services (FIS) center; and a message encoder and decoder unit in operative communication with the airline host, the data center, the operations center, or the ATC/FIS center; wherein the ground center is operative to provide a format style of parameters and/or portions of free text for an uplink message to be sent to the aircraft. The aircraft comprises an onboard database; a message encoder/decoder module in operative communication with the database; a display processor in operative communication with the message encoder and decoder module; and at least one onboard display device operatively coupled to the display processor. When the aircraft receives the uplink message from the ground center, the message encoder and decoder module in the aircraft decodes the uplink message, for both content and format style information, and sends the content and format style information to the display processor to generate parameter or free text highlighting information in the onboard display device corresponding to the content and format style information.

Example 14 includes the system of Example 13, wherein the onboard database comprises an AOC database, or a datalink display database.

Example 15 includes the system of Example 14, wherein the format style of parameters is defined in the AOC database or the datalink display database, or is based on parameter values according to logic defined in the AOC database or the datalink display database.

Example 16 includes the system of Example 13, wherein the format style of parameters and/or portions of free text is provided in the uplink message for each parameter or text portion of the uplink message.

Example 17 includes the system of Example 13, wherein the format style of parameters is provided in customization rules to provide customization to non-database defined static pages.

Example 18 includes the system of any of Examples 13-17, wherein the format style of parameters and/or portions of free text includes one or more of bold type, italics type, font type, font size, color, reverse video, background, encircling, boxing, underlining, or flashing.

Example 19 includes the system of any of Examples 13-18, wherein the onboard display device comprises a multi-function control display unit (MCDU), a multi-input interactive display unit (MIDU), or a cockpit display unit (CDU).

Example 20 includes the system of any of Examples 13-18, wherein the onboard display device comprises a touch screen controller with emulated display, a multi-function display (MFD), an electronic flight bag display, or a portable device display.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of formatting datalink messages, the method comprising:

receiving a datalink message at a destination;
decoding the datalink message at the destination for both content and format style information using a dynamic database driven technique based on conditional formatting logic defined in an airline operational communication (AOC) database, the conditional formatting logic comprising:
defining one or more parameter values for the format style information with a respective default formatting style,
changing the default formatting style of the one or more of the parameter values with a different formatting style when a condition of one or more of the parameter values changes; and
overriding the default formatting style of the one or more of the parameter values with the different formatting style;
sending the content and format style information to a display processor; and
generating parameter or free text highlighting information on a display screen corresponding to the content and format style information;
wherein the conditional formatting logic changes the one or more of the parameter values by using rules defined in the conditional formatting logic of the AOC database.

2. The method of claim 1, Wherein the format style of at least one of parameters and portions of free text includes one or more of bold type, italics type, font type, font size, color, reverse video, background, encircling, boxing, underlining, or flashing.

3. A computer program product comprising:
a non-transitory computer readable medium having instructions stored thereon executable by a processer to perform a method of formatting datalink messages according to claim 1.

4. A method of formatting datalink messages for air/ground communications, the method comprising:
receiving an uplink message in an aircraft;
decoding the uplink message in an avionics unit of the aircraft, using an onboard message encoder/decoder, and an onboard airline operational communication (AOC) database, for content and format style information using, a dynamic database driven technique based on conditional formatting logic defined in the AOC database, the conditional formatting logic comprising:
defining one or more parameter values for the format style information with a respective default formatting style;
changing the default formatting style of the one or more of the parameter values with a different formatting style when a condition of one or more of the parameter values changes; and
overriding the default formatting style of the one or more of the parameter values with the different formatting style;
sending the content and format style information to an onboard display processor;
and generating parameter or free text highlighting information on an onboard display screen corresponding to the content and format style information;
wherein the conditional formatting logic changes the one or more of the parameter values by using rules defined in the conditional formatting logic of the AOC database.

5. The method of claim 4, wherein the format style information includes one or more of bold type, italics type, font type, font size, color, reverse video, background, encircling, boxing, underlining, or flashing.

6. A computer program product comprising:
a non-transitory computer readable medium having instructions stored thereon executable by a processer to perform a method of formatting datalink messages for air/ground communications according to claim 4.

7. A system including one or more processors for formatting datalink messages for air/ground communications, the system comprising:
a ground center operative for datalink communications with an aircraft, the ground center comprising:
an airline host, a data center, an operations center, or an air traffic control (ATC) and flight information services (FIS) center; and
a message encoder and decoder in operative communication with the airline host, the data center, the operations center, or the ATC/FIS center;
wherein the ground center is operative to provide a format style of at least one of parameters and portions of free text for an uplink message to be sent to the aircraft;
wherein the aircraft comprises:
an onboard database comprising an airline operational communication (AOC) database;
an onboard message encoder and decoder in operative communication with the AOC database;
a display processor in operative communication with the onboard message encoder and decoder; and
at least one onboard display device operatively coupled to the display processor;
wherein when the aircraft receives the uplink message from the ground center, the onboard message encoder and decoder decodes the uplink message, for both content and format style information, using a dynamic database driven technique based on conditional formatting logic defined in the AOC database, the conditional formatting logic comprising:
defining one or more parameter values for the format style information with a respective default formatting style;
changing the default formatting style of the one or more of the parameter values with a different formatting style when a condition of one or more of the parameter values changes; and
overriding the default formatting style of the one or more of the parameter values with the different formatting style;
wherein the onboard message encoder and decoder subsequently sends the content and format style information to the display processor to generate parameter or free text highlighting information in the onboard display device corresponding to the content and format style information; and
wherein the conditional formatting logic changes the one or more of the parameter values by using rules defined in the conditional formatting logic of the AOC database.

8. The system of claim 7, wherein the format style of at least one of parameters and portions of free text includes one or more of bold type, italics type, font type, font size, color, reverse video, background, encircling, boxing, underlining, or flashing.

9. The system of claim 7, wherein the onboard display device comprises a multi-function control display unit (MCDU), a multi-input interactive display unit (MIDU), or a cockpit display unit (CDU).

10. The system of claim 7, wherein the onboard display device comprises a touch screen controller with emulated display, a multi-function display (MFD), an electronic flight bag display, or a portable device display.

* * * * *